(12) United States Patent
Becker et al.

(10) Patent No.: US 12,114,152 B2
(45) Date of Patent: Oct. 8, 2024

(54) METHOD FOR IDENTIFYING AND AUTHENTICATING A USER PROFILE FOR THE USE OF SERVICES ONBOARD A MOTOR VEHICLE

(71) Applicant: PSA AUTOMOBILES SA, Poissy (FR)

(72) Inventors: Jonathan Becker, Villepreux (FR); Yoann Leff, Rueil Malmaison (FR); Laurent Pognon, Guyancourt (FR); Ihsen Boughaba, Montrouge (FR)

(73) Assignee: PSA AUTOMOBILES SA, Poissey (FR)

( * ) Notice: Subject to any disclaimer, the term of this patent is extended or adjusted under 35 U.S.C. 154(b) by 291 days.

(21) Appl. No.: 17/635,369

(22) PCT Filed: Aug. 31, 2020

(86) PCT No.: PCT/FR2020/051514
§ 371 (c)(1),
(2) Date: Feb. 14, 2022

(87) PCT Pub. No.: WO2021/048482
PCT Pub. Date: Mar. 18, 2021

(65) Prior Publication Data
US 2022/0279347 A1    Sep. 1, 2022

(30) Foreign Application Priority Data

Sep. 13, 2019 (FR) .................................. 1910133

(51) Int. Cl.
*H04W 12/06*     (2021.01)
*H04L 9/40*      (2022.01)
(Continued)

(52) U.S. Cl.
CPC ......... *H04W 12/06* (2013.01); *H04L 63/0884* (2013.01); *H04L 67/306* (2013.01); *H04W 4/44* (2018.02); *H04W 8/18* (2013.01)

(58) Field of Classification Search
CPC ......... H04W 12/06; H04W 4/44; H04W 4/50; H04W 4/30; H04W 4/40; H04W 8/18;
(Continued)

(56) References Cited

U.S. PATENT DOCUMENTS

| | | | |
|---|---|---|---|
| 2010/0097178 A1* | 4/2010 | Pisz | G07C 9/28 340/5.72 |
| 2014/0165159 A1* | 6/2014 | Baade | H04L 63/08 726/4 |

(Continued)

FOREIGN PATENT DOCUMENTS

| WO | 2010045554 A1 | 4/2010 |
|---|---|---|
| WO | 2014035434 A1 | 3/2014 |

OTHER PUBLICATIONS

International Search Report for PCT/FR2020/051514 mailed Nov. 23, 2020.
Written Opinion for PCT/FR2020/051514 mailed Nov. 23, 2020.

*Primary Examiner* — Han Yang
(74) *Attorney, Agent, or Firm* — Sandberg Phoenix & von Gontard, PC

(57) ABSTRACT

The invention relates to a method for identifying and authenticating a user profile, allowing the use of services connected to a multimedia system on-board a motor vehicle (2), the multimedia system comprising a memory (221) comprising a user profile for a portable device (5), the vehicle comprising a first device for communicating with a remote server (3), the remote server comprising a memory (222) and a second system for communicating with the portable device, the portable device (5) comprising a memory, the method comprising a step of detecting the presence of a portable
(Continued)

device (5), if a portable device (5) is detected, the method comprises a step of receiving authentication information of the user, a step of transmitting the authentication information to the remote server, a step of verifying the authentication information, and a step of the multimedia system receiving a confirmation of the use of the user profile if the authentication information is compliant.

5 Claims, 2 Drawing Sheets

(51) Int. Cl.
    *H04L 67/306*     (2022.01)
    *H04W 4/44*     (2018.01)
    *H04W 8/18*     (2009.01)

(58) Field of Classification Search
    CPC . H04L 63/0884; H04L 63/102; H04L 67/306; B60R 16/037
    See application file for complete search history.

(56) References Cited

U.S. PATENT DOCUMENTS

| | | | |
|---|---|---|---|
| 2015/0210287 A1* | 7/2015 | Penilla | B60W 40/08 701/49 |
| 2018/0097804 A1* | 4/2018 | Boehm | G06Q 20/145 |
| 2020/0007600 A1* | 1/2020 | Tsoutsaios | H04L 67/54 |

* cited by examiner

[Fig. 1]
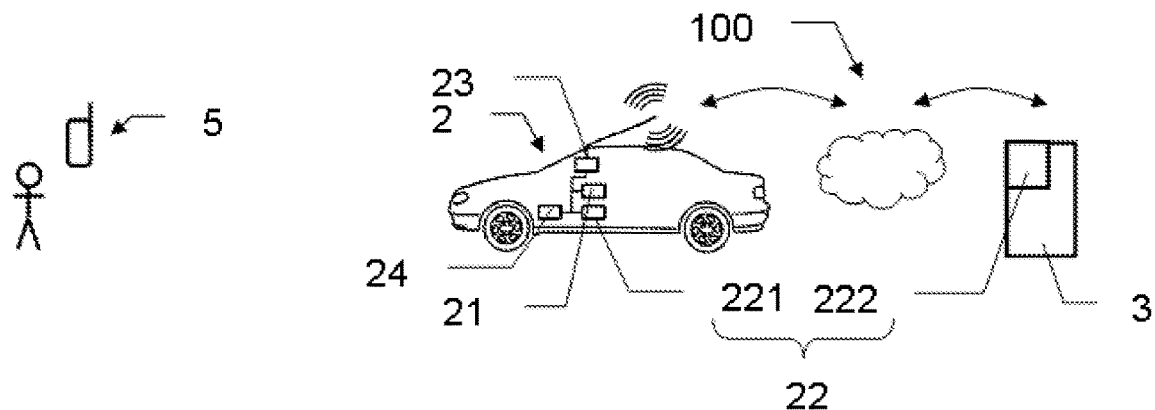
[Fig. 2]
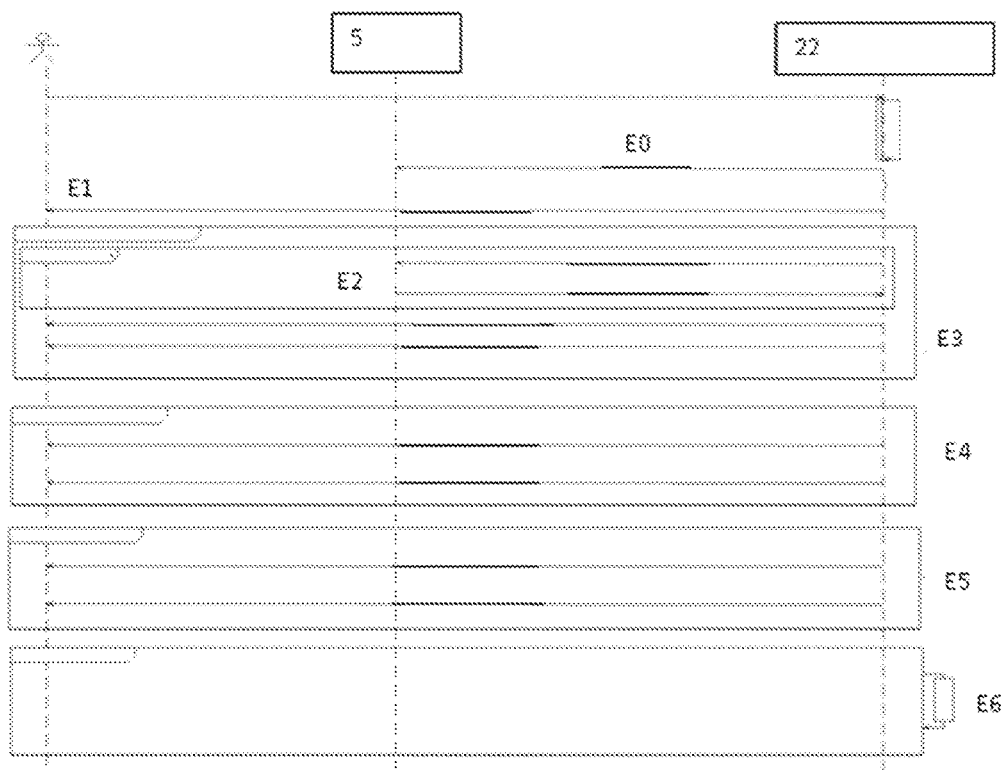

[Fig. 3]
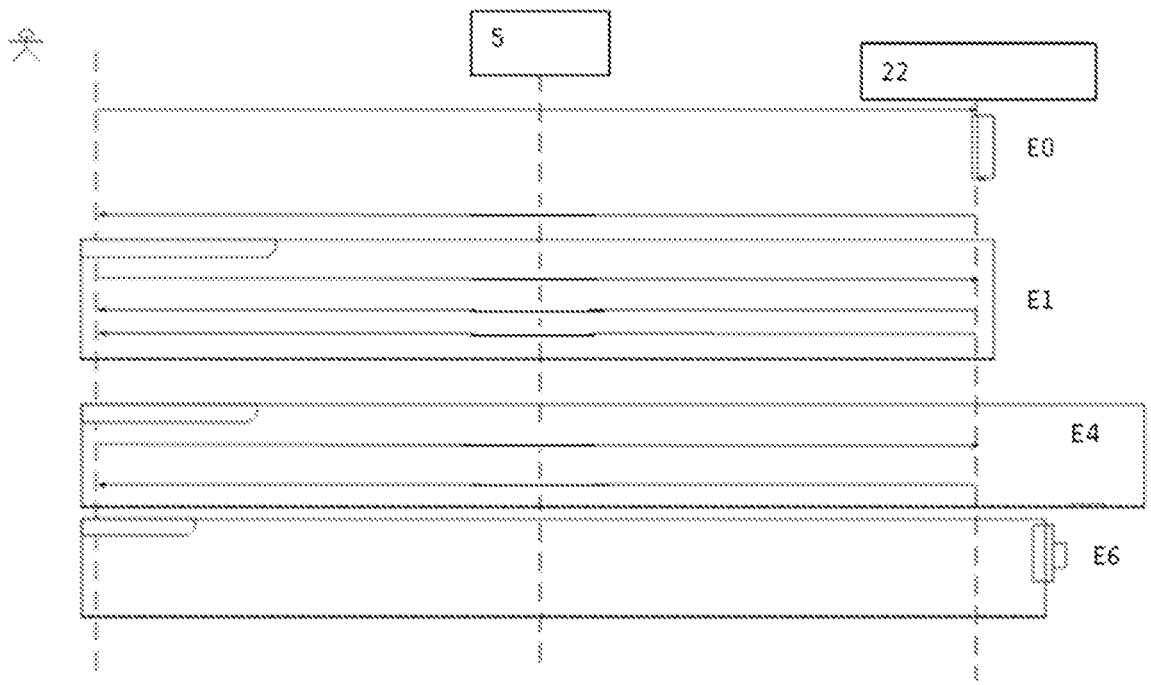

METHOD FOR IDENTIFYING AND AUTHENTICATING A USER PROFILE FOR THE USE OF SERVICES ONBOARD A MOTOR VEHICLE

CROSS-REFERENCE TO RELATED APPLICATIONS

This application is the US National Stage under 35 USC § 371 of International Application No. PCT/FR2020/051514, filed 31 Aug. 2020 which claims priority to French Application No. 1910133 filed 13 Sep. 2019, both of which are incorporated herein by reference.

BACKGROUND

The present invention relates generally to a method for identifying and authenticating a user profile for the use of services on-board a motor vehicle Vehicles of all types, such as private, commercial, utility, agricultural, collective or military vehicles, generally comprise on-board multimedia systems allowing access to on-board services such as the management of comfort parameters (cabin conditioning) or the reception of radio frequencies.

These on-board multimedia systems can now allow access to online services via remote connections, in particular wireless connections of the 3G, 4G, 5G type or Wi-Fi, Sigfox, ZigBee or LORA. These online services can provide access to content, for example audio, visual, or audiovisual content, or even update, map or navigation information.

Such a multimedia system is known for example from WO 2014/035434.

However, such online services may require login information in order to set up a backup of the content and/or settings or a subscription or payment system. This connection information may therefore be linked to a user's personal and/or banking information and it is not desirable to share this with other users of the vehicle.

WO201435434 describes a method for providing services in a unit of a vehicle, comprising the reception, by a server, of a request from a remote peripheral (a mobile device) of an authenticated user; the identification, by the server, of a remote vehicle unit associated with the request; and, in response to the request, the provision of services or information to the vehicle unit by the server based on the authenticated user's preferences.

However, this authentication is not linked to the profile identifying the user in the vehicle.

SUMMARY

An object, therefore, is to propose an identification and authentication method making it possible to take account of the various scenarios of the presence of one or more, or no, portable devices registered in the vehicle.

To this end, a method is disclosed for identifying and authenticating a user profile, thereby allowing the use of connected services on a multimedia system on board a motor vehicle, the multimedia system comprising an on-board memory in which a user profile for a portable device is stored, the vehicle comprising a first device for communicating with a remote server, the remote server comprising a storage memory and a second system for communicating with the portable device, the portable device comprising a storage memory, wherein the identification and authentication method comprises a step of detection by the multimedia system of the presence of a portable device in the vehicle; if a portable device is detected, the method comprises a step of reception by the multimedia system of the vehicle of authentication information of the user of the detected device stored on the detected portable device; a step of transmission by the multimedia system of the authentication information of the user of the detected portable device to the remote server; a step of verification, on the remote server, of the authentication information of the user of the detected portable device; if the user authentication information matches the identification information of a user recorded in the storage memory of the remote server and previously received by the remote server via the second communication system, then the method comprises a step of reception by the multimedia system of a confirmation of the use of the user profile stored on the multimedia device.

Thus, it is understood that the method identifies and authenticates this user only through the detection of the portable device.

According to another embodiment, the on-board memory of the multimedia system comprises a plurality of portable device user profiles, and if, during the step of detection by the multimedia system of the presence of a portable device in the vehicle, the multimedia system detects several portable devices, the authentication information of the step of sending the authentication information of the user of the detected portable device to the remote server corresponds to the user for which the use of the profile was validated most recently on the multimedia system.

According to another embodiment, if, during the step of detection by the multimedia system of the presence of a portable device in the vehicle, no portable device is detected by the multimedia system, the last user profile to be used on the multimedia system will be used.

In a second aspect a system is disclosed for identifying and authenticating a user profile, thereby allowing the use of connected services on a multimedia system on board a motor vehicle, wherein the system comprises means for implementing the steps of the identification and authentication method according to the first aspect of the invention In a third aspect a computer program comprises instructions for implementing the identification and authentication method according to the first aspect, when it is executed on one or more processors.

BRIEF DESCRIPTION OF THE FIGURES

Other features and advantages of the present invention will emerge more clearly on reading the following detailed description of an embodiment of the invention given by way of non-limiting example.

FIG. 1 shows the environment of a user of a motor vehicle for implementing the method;

FIG. 2 shows a diagram of the exchanges of the method between a user, driver or passenger of a motor vehicle and the motor vehicle, according to a first embodiment of the method; and FIG. 3 shows a diagram of the exchanges of the method between a user, driver or passenger of a motor vehicle and the motor vehicle, according to a second embodiment of the method according.

DETAILED DESCRIPTION

FIG. 1 schematically shows the environment of a user of a motor vehicle 2, who may be the driver or a passenger of the vehicle 2, and the vehicle 2. The user may have an electronic device 5, for example a smartphone, which will allow authentication to online services, as explained below.

Optionally, the vehicle 2 is connected to a remote extension server 3 via a communication network 100. The communication network 100 here comprises a mobile telephone network through which the vehicle 2 can connect to networks such as the Internet and access online services and/or multimedia applications, for example online services and/or applications dedicated to motor vehicle drivers and/or passengers.

The vehicle 2 comprises an on-board multimedia system provided in particular with return means comprising at least one display 21 arranged to display remote content, that is to say, remote applications, catalogs or services for a user of the vehicle. The vehicle 2 also comprises storage means in the form of a local memory unit 221 to store information, remote detection means and remote communication means such as a communication module 23 to allow communication with the electronic device 5 and/or with the remote extension server 3 via the communication network 100, and an authentication module 24 that may be used to authenticate the electronic device 5, in cooperation with the communication module 23 and the memory unit 221. Alternatively, the detection means and the remote connection means may be two different modules.

Finally, a person-machine interface, not shown, allows interaction with the user via a tactile layer of the display 21 and/or buttons and keyboards. Furthermore, the portable electronic device 5 may constitute at least part of the person-machine interface.

The expansion server 3 serves to extend certain capacities and/or functions of the vehicle 2, for example storage capacities. In particular, the extension server 3 may comprise a remote memory unit 222 arranged to store vehicle configuration data, so that these configuration data may be accessed from another vehicle. The system comprising the local memory unit 221 of the vehicle and the remote memory unit is called extended memory 22 of the vehicle.

During a prior configuration, for example during a parameterization step, one or more users of the vehicle 2 each create and configure at least one user profile, using the person-machine interface, for example the display 21 of the vehicle 2. All of the user profiles thus configured by the users are stored in the extended memory 22 of the vehicle 2, in particular in the local memory unit 221.

It is possible to envisage also storing the user profiles created in the remote memory unit 222 of the remote extension server 3. In this case, the memory units of the vehicle 2 and of the extension server 3 could be synchronized.

A user profile comprises an identifier represented by a name and/or an icon or image and associated with a portable electronic device identified for example by a unique identification number. In addition, a user profile may comprise a set of personal data relating to the user, in particular configuration data linked to the use of the vehicle 2 and specific to the user, such as for example a pre-established list of the user's favorite radio stations, adjustment data of a vehicle seat for the user, adjustment data of one or more mirrors for the user, etc.

In addition, the user's personal data may comprise a list of online services comprising, for example, remote applications, catalogs or content to be displayed or played by the multimedia system on-board the vehicle 2. Remote applications are, for example, applications that can monitor or forecast vehicle maintenance, financial services, or even mapping, navigation or tourist guidance services or services that offer navigation enhanced with information specific to customer interests. The content may be music or videos, newsletters or images. Catalogs may be a list or service that offers apps for purchase or subscriptions to remote content. In particular, provision may be made to store information for each user linked to the user's identity, in particular connection information such as passwords or payment authorizations for a given remote application, catalog or service.

It should be noted that an online service may typically be displayed in two forms: in a public mode, i.e. in its version accessible to any user, and in a private mode, i.e. once the user has selected an identifier and entered connection information, such as an access code or bank details, for example, to make purchases and pay for them.

Similarly, during another prior configuration, the user saves user authentication information on his portable device 5, for example via a dedicated application stored on the portable device. According to the system, his authentication information is also stored on the remote server. This authentication information is used to validate the use of services linked to the user.

According to a first step E0 of the method, the multimedia system of the vehicle 2 detects a portable device 5 present in the vehicle 2. This detection is triggered for example when the vehicle 2 is unlocked or when the ignition of the vehicle is switched on. If a portable device 5 is detected and corresponds to a previously saved user profile, the user profile is then preselected on the vehicle's multimedia system. If the user selects the pre-selected user profile on the multimedia system, the portable device 5, at step E1, transmits the user authentication information stored on the portable device to the multimedia system of the vehicle 2. Upon receipt of this authentication information, the multimedia system sends an authentication request from the user of the detected portable device 5 to the remote server. The authentication request comprises the authentication information. The authentication information received by the server is compared with the authentication information stored on the remote server 222. If the received authentication information does match authentication information already stored, the remote server 22, at step E2, transmits a request to the multimedia system of the vehicle for validation of the use of the user profile selected by the user. The reception by the multimedia system of the vehicle of the request for validation of the use of the selected user profile, at step E3, triggers the activation of the services associated with the user profile as well as the activation of the configuration data linked to the use of the vehicle.

According to an alternative embodiment, if several previously registered portable devices 5 are detected by the multimedia system during the detection step, the user profile preselected on the multimedia system will correspond to the one validated most recently on the multimedia system.

According to another alternative embodiment, if no previously registered portable device 5 is detected by the multimedia system during the detection step, the user profile preselected on the multimedia system will correspond to the one validated most recently on the multimedia system. However, if this user profile is selected by the user, the activation of the services associated with this profile will be triggered only in a mode in which the user's personal data cannot be used, i.e. in public mode.

If the user decides not to select the preselected user profile on the multimedia system at the end of the detection stage, then he has several possible options. According to a first option, he may, at step E4, select another user profile from a list of user profiles already saved on the multimedia system. In this case, the activation of the services associated with this profile will be triggered only in a mode in which the user's personal data cannot be used, i.e. in public mode.

According to a second option, the user may, at step E5, select none of the user profiles proposed in the list of user profiles already registered on the multimedia system. In this case, the default preselected user profile will automatically be triggered by the multimedia system in a mode in which the user's personal data cannot be used, that is to say, in public mode if the vehicle 2 is used (i.e. if the ignition is on). If the vehicle 2 is stationary, the multimedia system of the vehicle 2 may, at step E6, switch off automatically after a determined period.

It will be understood that various modifications and/or improvements obvious to a person skilled in the art may be made to the various embodiments of the method and system described in the present description without departing from the scope of the claimed invention.

The invention claimed is:

1. A method for identifying and authenticating a user profile, making it possible to use connected services on a multimedia system on board a motor vehicle, the multimedia system comprising an on-board memory in which a user profile for a portable device is stored, the vehicle comprising a first device for communicating with a remote server, the remote server comprising a storage memory and a second system for communicating with the portable device, the portable device comprising a storage memory, wherein the identification and authentication method comprises:
   a step of detection by the multimedia system of a presence of a portable device in the vehicle;
when a portable device is detected, the method comprises:
   a step of reception by the multimedia system of the vehicle of authentication information of the user of the detected device stored on the detected portable device,
   a step of sending by the multimedia system the authentication information of the user of the detected portable device to the remote server,
   a step of verification, on the remote server, of the authentication information of the user of the detected portable device,
when the user authentication information matches the identification information of a user recorded in the storage memory of the remote server and previously received by the remote server via the second communication system, then the method comprises:
   a step of reception by the multimedia system of a confirmation of the use of the user profile stored on the multimedia device.

2. The method for identifying and authenticating a user profile according to claim 1, wherein the on-board memory of the multimedia system comprises a plurality of portable device user profiles, and when, during the step of detection by the multimedia system of the presence of a portable device in the vehicle, the multimedia system detects several portable devices, the authentication information of the step of sending the authentication information of the user of the detected portable device to the remote server corresponds to the user for which the use of the profile was validated most recently on the multimedia system.

3. The method for identifying and authenticating a user profile according to claim 1, wherein when, during the step of detection by the multimedia system of the presence of a portable device in the vehicle, no portable device is detected by the multimedia system, the last user profile to be used on the multimedia system will be used.

4. A system for identifying and authenticating a user profile, making it possible to use connected services on a multimedia system on board a motor vehicle, wherein the system comprises means for implementing the identification and authentication steps according to claim 1.

5. A computer system comprising one or more processors, a non-transitory computer readable medium, and a computer program stored on said non-transitory computer readable medium, the computer program comprising instructions, which when executed by said one or more processors implement the method for identifying and authenticating a user profile according to claim 1.

* * * * *